United States Patent [19]

Freeman et al.

[11] Patent Number: 4,751,973
[45] Date of Patent: Jun. 21, 1988

[54] LOAD CELL SCALE WITH REFERENCE CHANNEL FOR LIVE LOAD CORRECTION

[75] Inventors: Gerald C. Freeman, Norwalk; Seymour Feinland, Stamford, both of Conn.

[73] Assignee: Pitney Bowes Inc., Stamford, Conn.

[21] Appl. No.: 96,990

[22] Filed: Sep. 16, 1987

[51] Int. Cl.[4] .................. G01G 23/10; G01G 19/00
[52] U.S. Cl. .................................. 177/25; 177/185; 177/200
[58] Field of Search ............... 177/1, 185, 25.14, 200

[56] References Cited

U.S. PATENT DOCUMENTS

| | | | |
|---|---|---|---|
| 2,767,974 | 10/1956 | Ballard et al. | 177/200 X |
| 2,767,975 | 10/1956 | Horst et al. | 177/200 |
| 3,322,222 | 5/1967 | Baur | 177/200 X |
| 4,212,361 | 7/1980 | Stocker | 177/200 |
| 4,258,811 | 3/1981 | Franzon et al. | 177/200 |
| 4,396,080 | 8/1983 | Dee | 177/185 |
| 4,553,618 | 11/1985 | Kusmenskji et al. | 177/185 |
| 4,624,331 | 11/1986 | Naito | 177/185 |
| 4,667,297 | 5/1987 | Kawai . | |

Primary Examiner—George H. Miller, Jr.
Attorney, Agent, or Firm—Gerald E. Linden; David E. Pitchenik; Melvin J. Scolnick

[57] ABSTRACT

Cancellation of noise in the weighing channel output of an electronic scale due to external vibrations is achieved by use of a reference, non-weighing channel in the scale. The reference channel is exposed to the vibrations affecting the weighing channel. The average output, Aavg, of the reference channel is divided by the instantaneous output, $A_t$, thereof, and the result is multiplied by the instantaneous output, $W_t$, of the weighing channel to obtain a corrected output, Wavg, indicative of the weight of an article plus tare. Method and Apparatus are disclosed. Analog and Digital embodiments of the apparatus are disclosed.

12 Claims, 1 Drawing Sheet

LOAD CELL SCALE WITH REFERENCE CHANNEL FOR LIVE LOAD CORRECTION

TECHNICAL FIELD OF THE INVENTION

The invention relates to electronic weighing scales and, more particularly, to scales operating in a vibratory environment.

BACKGROUND OF THE INVENTION

Electronic scales for weighing articles such as letters or parcels are well known. Typically such a scale includes a weighing platform exerting its own (tare) weight on a strain gauge load cell, the output of which is amplified, digitalized, converted to weight units, tare subtracted, and provided to a suitable display, such as a digital display, which indicates the weight of the article, or "live load". The indicated weight can be used to automatically determine a rate (dollar amount) which may ultimately be provided to a postage meter or parcel register for setting a postage or shipping amount for the article. Articles may also be automatically fed by conveying devices to the scale, and from the scale to the meters or register. These external devices, conveyors, meters and registers, all involve mechanical operations that, together with ground vibration from rotating machinery, passing traffic, etc., create a hostile vibratory environment for the scale. These external vibrations, or g-variations are reflected in the output of the load cell (strain gauge and amplifier) as noise, or variations in the indicated weight signal. In weighing operations requiring or benefiting from a high degree of accuracy, noise in the indicated weight signal is unacceptable. For instance, for letters a small increment in indicated weight that is not truly reflective of actual weight can cause more postage than is necessary to be applied to the letter. In high volume mailing applications, an erroneous, albeit small postage increment can become very significant. Other so-called called "hostile" weighing environments would include scales mounted in a vehicle, such as a parcel van with its associated engine vibration; or on shipboard applications where changing tilt angles and engine vibration are present.

Two approaches have been taken to eliminate the effects of ground vibrations on the scale: mechanically isolating the scale from the vibrations, such as by resilient mounting; and electronically compensating for the noise in the output of the load cell. The latter is the subject at hand.

One approach to compensating for noise in the output of a load cell is to filter its output to eliminate noise in the frequency range of the vibrations. However, a tradeoff is ultimately involved in the weighing time since the vibrations are typically low frequency (1–30 hz). U.S. Pat. No. 4,212,361, issued to Stocker in 1980, addresses this issue through the use of a second, reference load cell and at least one frequency dependent network coupling the reference load cell to the weighing load cell and having a transfer characteristic varying as a predetermined function of frequency.

One of the drawbacks of Stocker is that it is limited to noise correction for a particular, reference weight. In postal/shipping operations, a scale may be required to operate with great accuracy over a wide range of weights, such as between 1 ounce and 70 pounds. Other problems attendant Stocker, and the references discussed hereinafter are the stability of the noise correction technique (i.e., nonsusceptability to drift in the reference and/or weighing load cell) and simplicity (typically, simplicity equate with reliability).

U.S. Pat. Nos. 2,767,974 issued to Ballard, 2,767,975 issued to Horst, and 4,396,080 issued to Dee all involve, in one way or another, providing a reference load cell, and subtracting its output from the output of the weighing load cell to "cancel out" the noise in the weighing load cell output. Dee includes a filling-up-type weighing operation, wherein only a discrete, predetermined article weight is pertinent. Ballard involves adjusting the output of the weighing load cell to match that of the reference load cell as loaded with a predetermined weight—the extent of adjustment required to match the two outputs being a measure of the unknown weight on the weighing load cell. Horst involves simple subtraction which, as stated hereinbefore, is pertinent, or accurate, for eliminating noise for only a particular weight. EPC Application No. 84302548.7 is also cited as being limited by the "subtraction" technique.

U.S. Pat. No. 3,322,222 issued to Bauer discloses a reference load sensor, the output of which is divided into the output of the main load sensor, in the context of an electromagnetic balance, to eliminate weighing errors attributable to gross gravitational variations, such as due to changes in altitude, field deterioration in the magnets, vibrations, and scale inclination. U.S. Pat. No. 4,258,811 issued to Franzon also discloses dividing the output of a reference cell into the weighing cell.

U.S. Pat. No. 4,624,331 issued to Naito discloses obtaining a noise level from the reference cell, by removing the DC (steady state) component thereof, adjusting the gain applied to the reference cell noise level, and adding the gain adjusted noise output of the reference cell in opposite phase relation (i.e. subtracting to the output of the unloaded weighing cell. The signal resulting from this addition is multiplied by the noise level of the reference cell, and the result is gain adjusted to match the noise level (DC component removed) of the weighing cell. A multiple stage comparator effects the latter gain adjustment in dependence upon the weight of the article being weighed to obtain a corrected noise signal which is ultimately subtracted from the noisy output of the weighing cell. Naito addresses the problem of providing effective noise cancellation over a range of live loads in a very complex manner, particularly the gain adjustments involved, and is limited in that errors, such as drift, in the reference cell channel will cause proportional errors in the correction term applied to the weighing cell output.

Thus, what is needed is a technique for eliminating noise from the output of a weighing cell that is simple, relatively unaffected by any drift, and that exhibits inherent veracity over a wide range of live loads applied to the weighing cell. It is an object of the present invention to achieve these characteristics.

DISCLOSURE OF THE INVENTION

According to the invention an electronic scale has a weighing channel providing an output $W_t$ indicative of the instantaneous weight of an article being weighed. The scale is provided with a reference channel disposed in a suitable manner with respect to the weighing channel to provide an output, $A_t$, indicative of the instantaneous vibration affecting the weighing channel. The reference channel output, $A_t$, is averaged over a suitable period of time to obtain a reliable indication of its steady state level (component), $A_{avg}$, which is indicative of the output of the channel if there were no vibration present. The steady state level, $A_{avg}$, is divided by the instantaneous output, $A_t$, of the reference channel to obtain a correction term, $A_{avg}/A_t$, which is applied by multiplication to the instantaneous output, $W_t$, of the weighing channel to obtain a vibration-corrected signal, $W_{avg}$, indicative of the weight of the article plus tare.

Analog circuit and microprocessor-based embodiments of the invention are disclosed.

Other objects, features, and advantages of the invention will become apparent in light of the following description thereof.

DETAILED DESCRIPTION OF THE INVENTION

Figure 1:
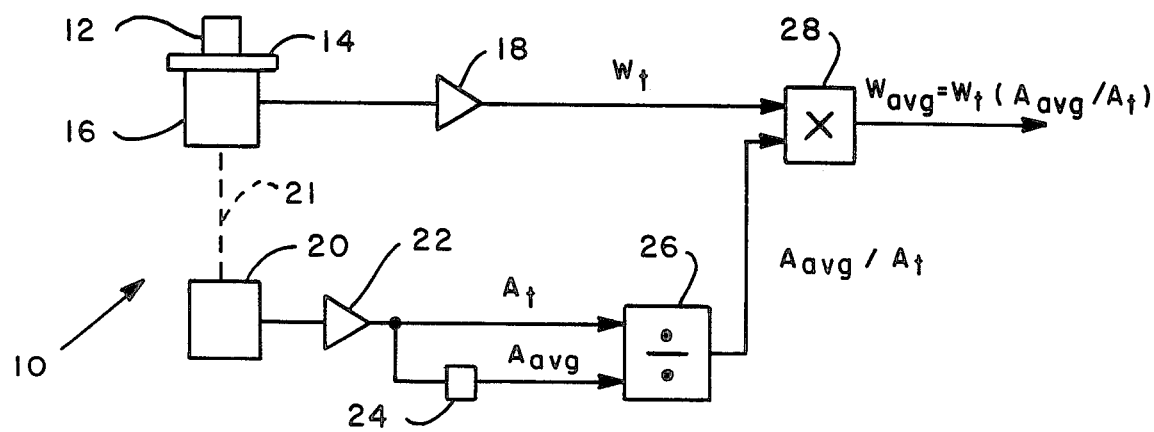
FIG. 1 is a schematic of an analog embodiment of the invention.

FIG. 1 shows an electronic scale 10 for weighing an article 12, such as a letter or a parcel. The article 12, is placed on a platen 14 so as to exert a force due to gravity on a weight transducer 16, such as a strain gauge load cell. The force of the platen 14, and any other incidental constant masses bearing upon the transducer are termed "tare weight". Techniques for ultimately "zeroing out" that portion of the signal attributable to the tare weight are well known.

Typically, output of the transducer 16 requires amplification to a level suitable for driving a display device (not shown). Therefore, an amplifier 18 receives the transducer output and provides an amplified signal, $W_t$. Collectively, the transducer 16 and amplifier 18 are referred to as the "weighing channel".

The weighing channel output, $W_t$, is indicative of the instantaneous apparent weight of the article 12 and platen 14. When the scale 10 is operating in a vibratory environment, the vibrations will be manifested as noise, or irregularities, in the weighing channel output, $W_t$, since the article is exposed to a varying gravitational force, $G_t$, consisting of the local gravitational constant $g = G_{avg}$, plus the variations representing the effects of vibration.

It is the principal object of this invention to eliminate the adverse effects upon accurate weighing of the vibratory forces so as to arrive at a true measure of article weight. The true (vibration-compensated) article plus tare weight is expressed as $W_{avg}$, and at any given instant should equal $W_t$ times a quantity, $G_{avg}/G_t$, indicative of an instantaneous correction for vibration. The article weight 12 is then obtained by subtracting the known tare weight 14. This is commonly done by a determination of the initial output with the platen empty, during an initialization process when power is switched on, or a ZERO button is depressed; this output is stored for subsequent subtraction. The invention addresses a simple technique for obtaining the correction term, $G_{avg}/G_t$.

A second weight transducer 20, such as a strain gauge, load cell, is suitably disposed in the scale in mechanical proximity to the first transducer 16, as indicated by the dashed line 21, so as to affected in a similar manner to the external vibrations affecting the weighing transducer 16. The reference transducer 20 is similar to the weighing transducer 16 to the extent necessary to yield similar signals as a function of vibrations. Within this constraint, the reference transducer can be cheaper and simpler since it can be coarse relative to accuracy requirements such as linearity and output temperature coefficient. No article is placed on the reference transducer 20 for weighing; rather, a fixed (reference) weight is permanently attached to it.

An amplifier 22, similar to the amplifier 18, provides the reference channel output, $A_t$, which is indicative of the vibratory forces, $G_t$, affecting the reference channel, i.e., manifested in any mass associated with the transducer 20. Due to the mechanical proximity of the reference channel transducer 20 to the weighing channel transducer 16, the reference channel output, $A_t$, is indicative of the instantaneous vibrations affecting the weighing channel output, $W_t$.

The reference channel output, $A_t$, is provided to a circuit 24, such as a low pass filter, in order to obtain a value, $A_{avg}$, for the average, or steady state component, of the vibration level in the reference channel. Due to the mechanical proximity of the reference cell transducer 20 and the weighing cell transducer 16, the output, $A_{avg}$, of the low pass filter 24 will be indicative of the steady state component of the vibration level in the weighing channel.

The cutoff frequency of the low pass filter 24 is selected based on the frequency of the vibrations anticipated to be encountered. For example, the cutoff frequency may be established at 0.1 Hertz, or even lower.

The reference channel output, $A_t$, and the low pass filter output, $A_{avg}$, are provided to a divider circuit 26. The output of the divider circuit 26 is the quotient of the low pass filter output, $A_{avg}$, divided by the reference channel output, $A_t$, and represents a "correction term", $A_{avg}/A_t$, to be applied to the weighing channel output, $W_t$. The correction term, $A_{avg}/A_t$, is independent of any gain and insensitive to drift in the reference channel. Thus, the gain adjustments of prior art techniques, such as were discussed with respect to the Naito Patent, are unnecessary. Due to this beneficial result and the mechanical proximity of the reference and weighing cells, it is evident that the correction term, $A_{avg}/A_t$, is, for all intents and purposes, equal to the quantity $G_{avg}/G_t$ in both the reference and weighing cells.

Since the correction term, $A_{avg}/A_t$, is equal to the quantity, $G_{avg}/G_t$, it may be applied to the weighing channel output, $W_t$, to arrive at a vibration-compensated value, $W_{avg}$, indicative of the true weight of an article (plus tare) being weighed. To this end, the correction term, $A_{avg}/A_t$, is multiplied in a multiplier circuit 26 by the weighing channel output, $W_t$, to arrive at the valve, $W_{avg}$. Thus $$W_{avg} = W_t(A_{avg}/A_t).$$

With the present invention, the effects of both reference and the weighing channel zero shifts (drift) will cause an error of the correction term which is approximately equal to the ratio of the drift to $A_{avg}$. Thus relatively large drifts, as for example 10% of the channel output, will cause the correction term $A_{avg}/A_t$ to be in error by about 10%—still allowing for reduction of the vibration—induced error by 90%.

Thus, the following advantages are obtained by this invention, for instance as measured against the Naito Patent.

a. No need to adjust gains;

b. No need to extract and manipulate a noise component the signals $W_t$ or $A_t$;
c. Few arithmetic operations;
d. Few components required;
e. Minimal susceptability to drift; and
f. Veracity over a wide range of live loads.

The invention may also be practiced using digital techniques, as follows, with the same advantages.

Figure 2:
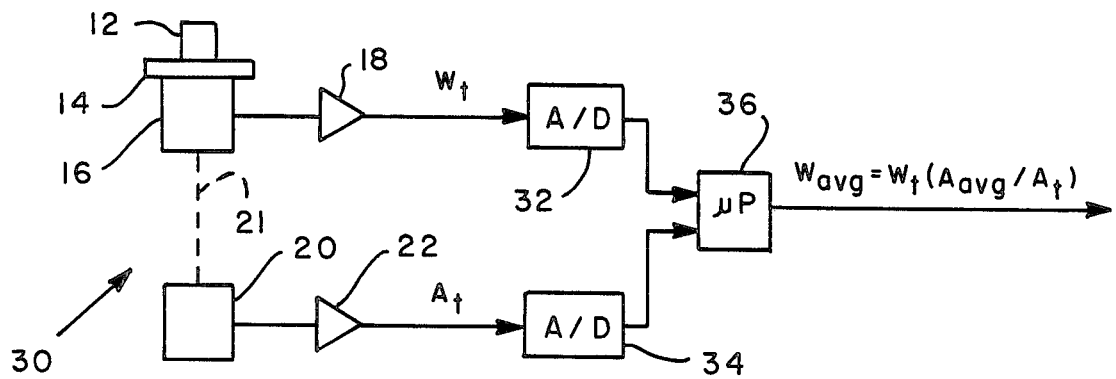
FIG. 2 is a schematic of a digital embodiment of the invention.
Figure 3:
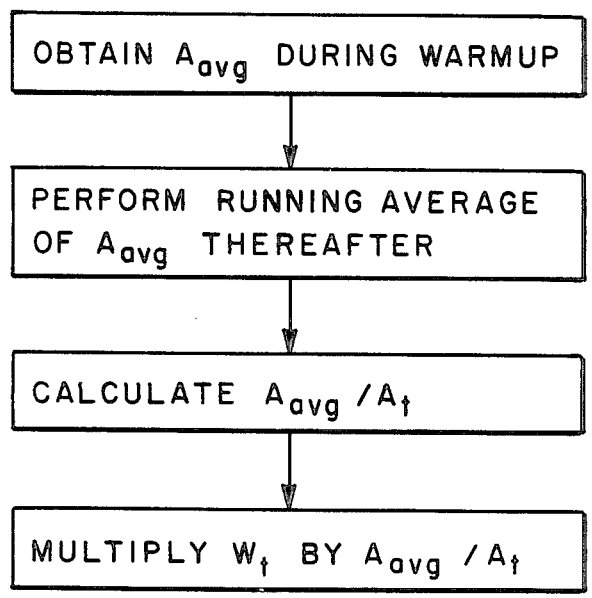
FIG. 3 is a flowchart relating to FIG. 2.

FIG. 2 shows an electronic scale 30 having the same transducers 16, 20 and amplifiers 18 and 22 as the scale 10, for the same purpose. The output of the weighing channel is provided to an analog-to-digital (A/D) circuit 32. The output of the reference channel is provided to an A/D circuit 34. The outputs of the A/D circuits 32 and 34 are provided to a micro-processor 36 which performs the functions of:

a. obtaining $A_{avg}$;
b. calculating $A_{avg}/A_t$; and
c. multiplying $A_{avg}/A_t$ times $W_t$ to obtain $W_{avg}$;

as shown in the simplified flowchart of FIG. 3, and subtracting the known tare weight to obtain the article weight.

In the microprocessor-based embodiment of FIG. 2, the two A/D circuits 32 and 34 must be driven by signals derived from transducers whose outputs are essentially identical as a function of ground vibration and, the signal sampling duration (e.g., the integration time of a dual-slope A/D) must be closely overlapped to sample during the same period in time.

The averaging function, obtaining $A_{avg}$ from $A_t$, may be performed by calculation of a "running average" wherein the sum of samples, taken over a fixed period of time related to a fixed number of samples, is continuously adjusted by adding the latest sample and subtracting the earliest sample from the running total (after the first fixed time period has elapsed). For example, $A_t$ may be sampled 50 times per second over a fixed time period of 20 seconds. Thus, a significant period of time will be required prior to the first weighing cycle, during which the scale cannot be used, while samples are gathered. A "warm up" time of 2 minutes or more is often specified for an electronic scale to allow for temperature gradient in semiconductor components and load cells to settle and to establish stable outputs with which the initial sample-gathering can be overlapped.

What is claimed:

1. An electronic scale for weighing an article, comprising:
    a weighing channel providing an output indicative of the instantaneous weight of an article;
    a reference channel providing an output indicative of instantaneous vibrations affecting the output of the weighing channel;
    first means for providing a signal indicative of the steady state component of the output of the reference channel, in response to the output of the reference channel;
    second means for providing a correction term indicative of the quotient of the steady state component of the output of the reference channel divided by the instantaneous output of the reference channel; and
    third means for providing a vibration-compensated output indicative of the product of the output of the weighing channel and the correction term.

2. Apparatus according to claim 1, wherein:
    the weighing channel includes a strain gauge load cell and an amplifier.

3. Apparatus according to claim 2, wherein:
    the reference channel includes a strain gauge load cell and an amplifier, whose response to vibration is similar to that of the weighing channel.

4. Apparatus according to claim 1, wherein:
    the first means includes a low pass filter with a cutoff frequency below the frequencies contained in the vibrations, and low enough so that its output represents the steady state component of the reference channel output.

5. Apparatus according to claim 4, wherein:
    the cutoff frequency of the low pass filter is 0.1 Hertz, or lower.

6. Apparatus according to claim 1, wherein:
    the second means includes an analog divider circuit.

7. Apparatus according to claim 1, wherein:
    the third means includes an analog multiplier circuit.

8. Apparatus according to claim 1, wherein:
    the second and third means are embodied in a suitably programmed microprocessor.

9. Apparatus according to claim 8, wherein:
    the first means is embodied in a suitably programmed microprocessor.

10. Apparatus according to claim 9, wherein the first means provides the steady state component of the output of the reference channel by maintaining a running average of a sufficient number of samples of the instantaneous output of the reference channel over a sufficient period of time to ensure veracity in an indication of the average vibration level in the reference channel.

11. Apparatus according to claim 10, wherein:
    the sufficient number of samples is on the order of 1000 and the sufficient period of time is on the order of 20 seconds.

12. A method of obtaining a vibration-corrected output from the weighing channel of an electronic scale, the electronic scale including a reference channel, exposed to vibrations affecting the weighing channel comprising:
    obtaining a steady state component of the output of the reference channel;
    obtaining a correction term by dividing the steady state component of the output of the reference channel by the instantaneous output of the reference channel; and
    multiplying the instantaneous output of the weighing channel by the correction term.

* * * * *